United States Patent [19]

Chitayat

[11] Patent Number: 4,839,545
[45] Date of Patent: Jun. 13, 1989

[54] COOLING SYSTEM FOR LINEAR MOTOR

[76] Inventor: Anwar Chitayat, Duck Island, P.O. Box 107, Northport, N.Y. 11768

[21] Appl. No.: 109,204

[22] Filed: Oct. 16, 1987

[51] Int. Cl.[4] .......................................... H02K 41/00
[52] U.S. Cl. ...................................... 310/12; 310/16; 310/58; 318/135
[58] Field of Search .................. 310/12, 13, 14, 15, 310/58, 16, 59, 64, 60 R, 216, 65; 318/135; 336/60, 62

[56] References Cited

U.S. PATENT DOCUMENTS

| | | | |
|---|---|---|---|
| 3,668,444 | 6/1972 | Davey | 310/13 |
| 3,835,339 | 9/1974 | Larzone | 310/16 |
| 3,902,146 | 8/1975 | Muralidharan | 336/60 |
| 3,913,045 | 10/1975 | Von Starck | 310/13 |
| 4,000,482 | 12/1975 | Staub | 336/60 |
| 4,429,206 | 1/1984 | Kothmann | 336/62 |
| 4,560,911 | 12/1985 | Chitayat | 310/13 |
| 4,625,132 | 11/1986 | Chitayat | 310/13 |
| 4,749,921 | 6/1988 | Chitayat | 310/12 |

FOREIGN PATENT DOCUMENTS 2809070 9/1978 Fed. Rep. of Germany ........ 310/16

Primary Examiner—R. Skudy
Attorney, Agent, or Firm—Thomas R. Morrison

[57] ABSTRACT

An armature of a linear motor is cooled by a serpentine channel formed in the lower surface thereof and sealed with a sealing plate. In one embodiment, the serpentine channel is formed in a separate cold plate in good thermal contact with laminations of the armature. In another embodiment, the serpentine channel is formed by stacking bundles of laminations having suitably formed notches therein. The bottom of the serpentine channel is sealed with a sealing plate. A sealant layer between the laminations of the serpentine channel prevents coolant leakage from the serpentine channel into the laminations. A sealing interlayer, may be interposed between the surfaces of the lamination bundles and the sealing plate both for sealing against coolant leakage and for affixing the sealing plate in position. The sealant layer and the sealing interlayer may be of the same material and formed at the same time.

11 Claims, 6 Drawing Sheets

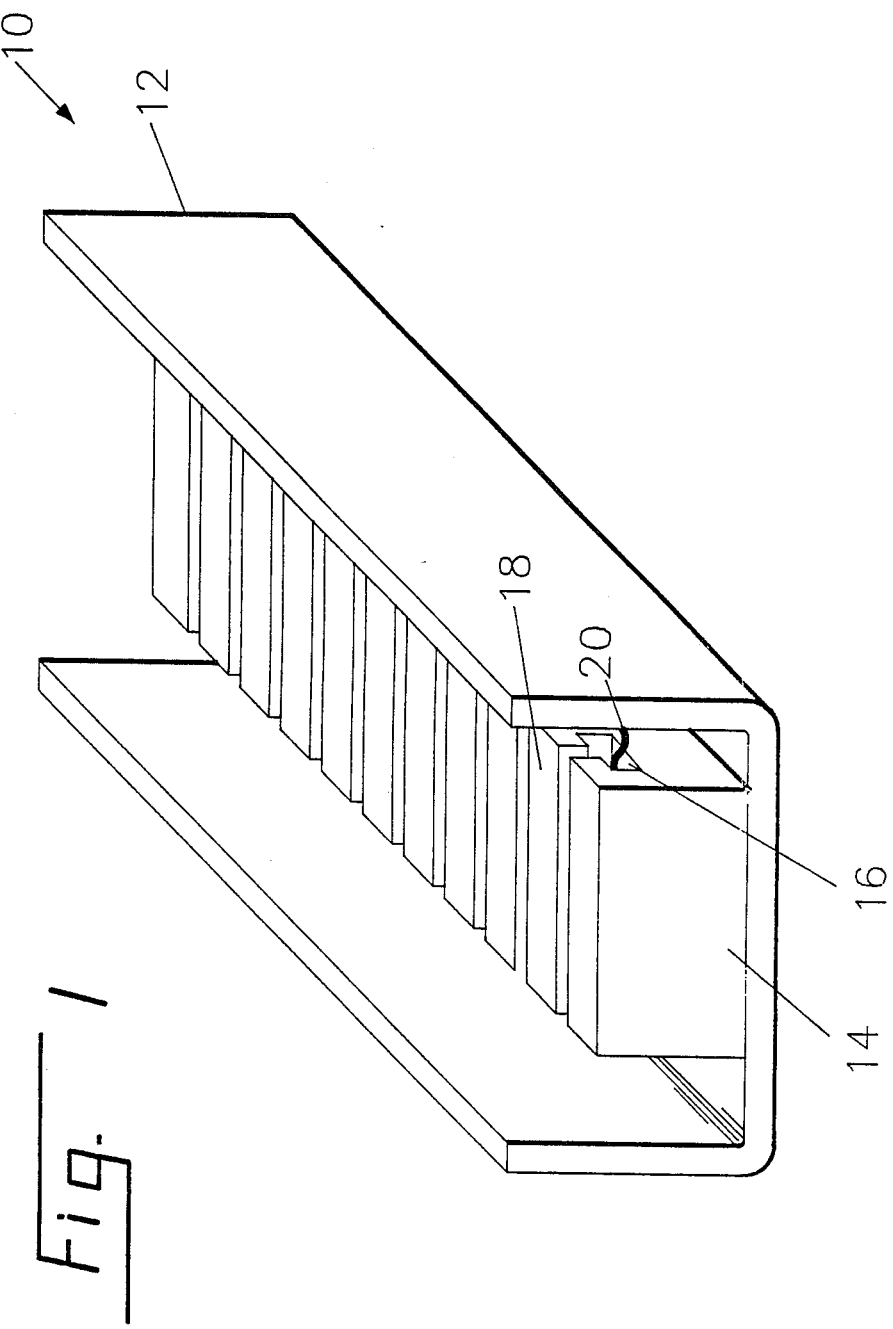

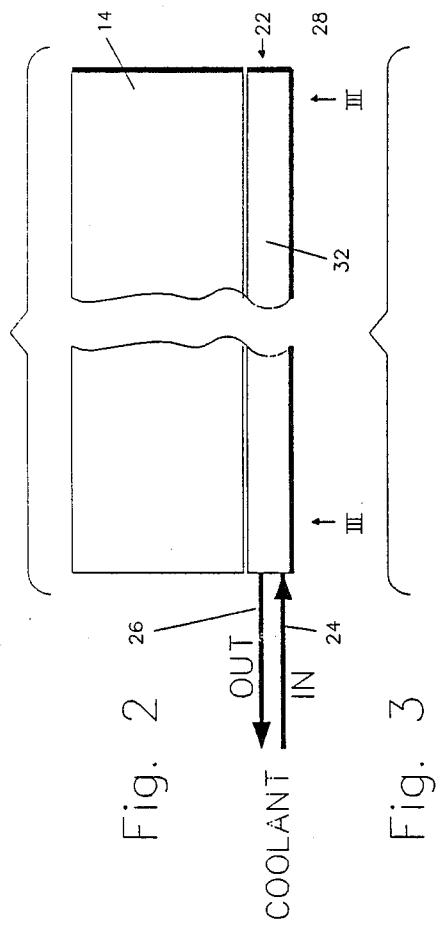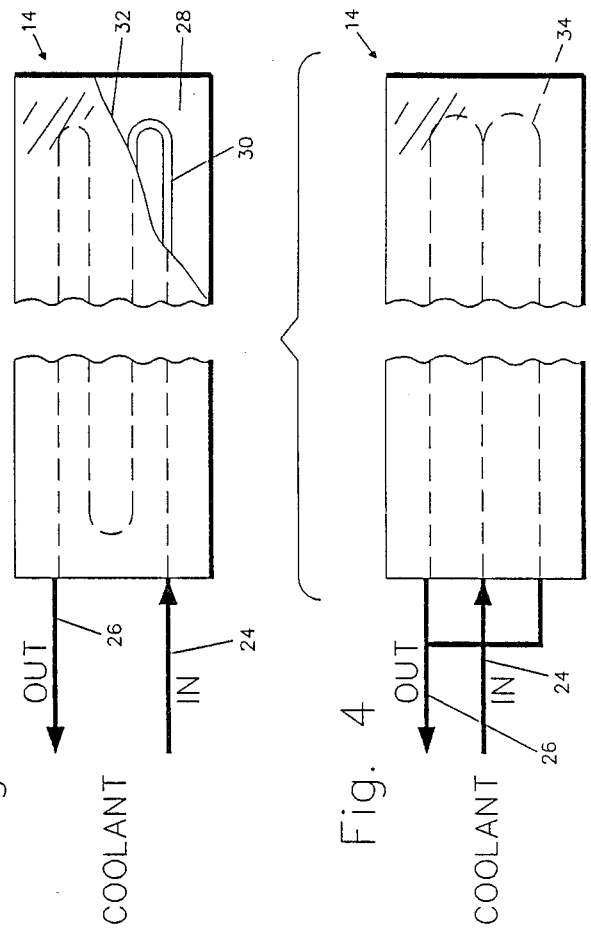

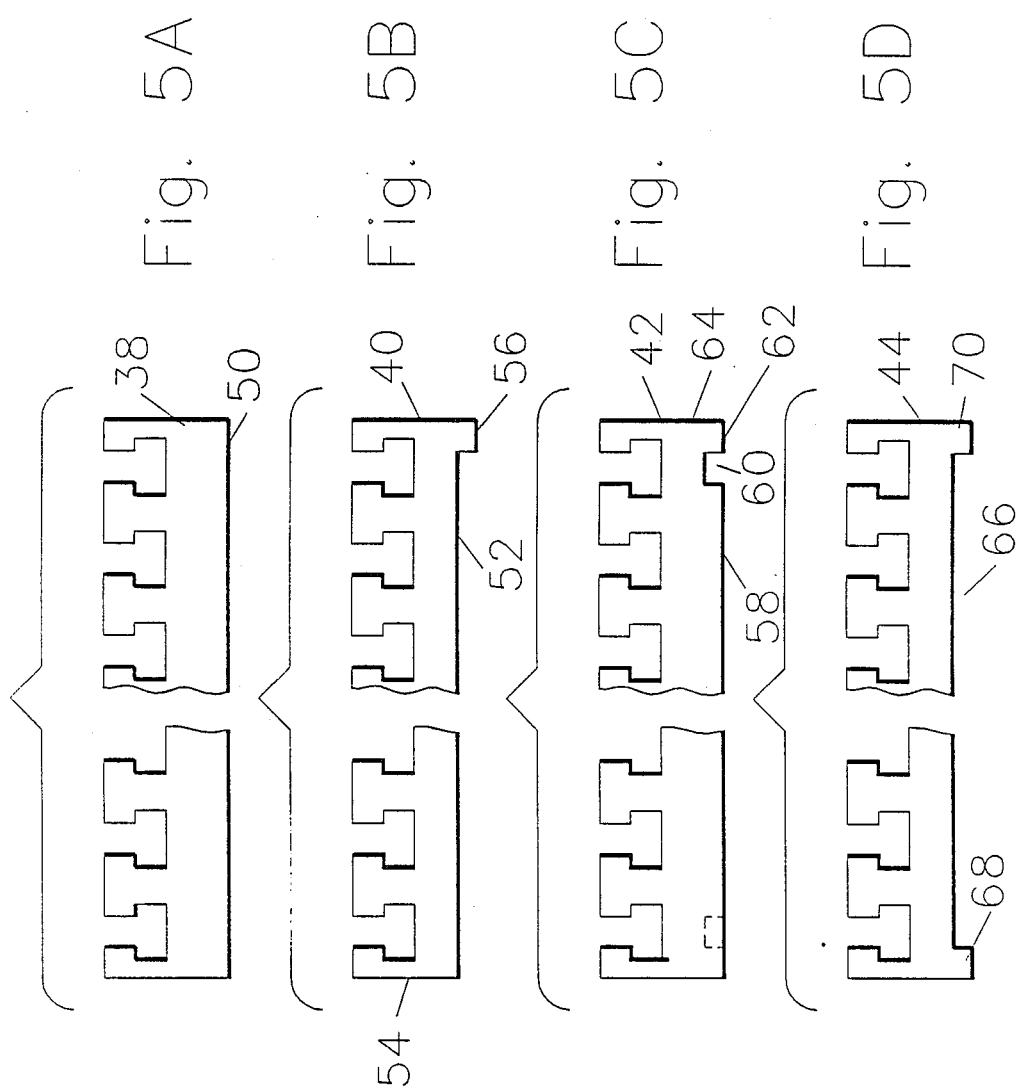

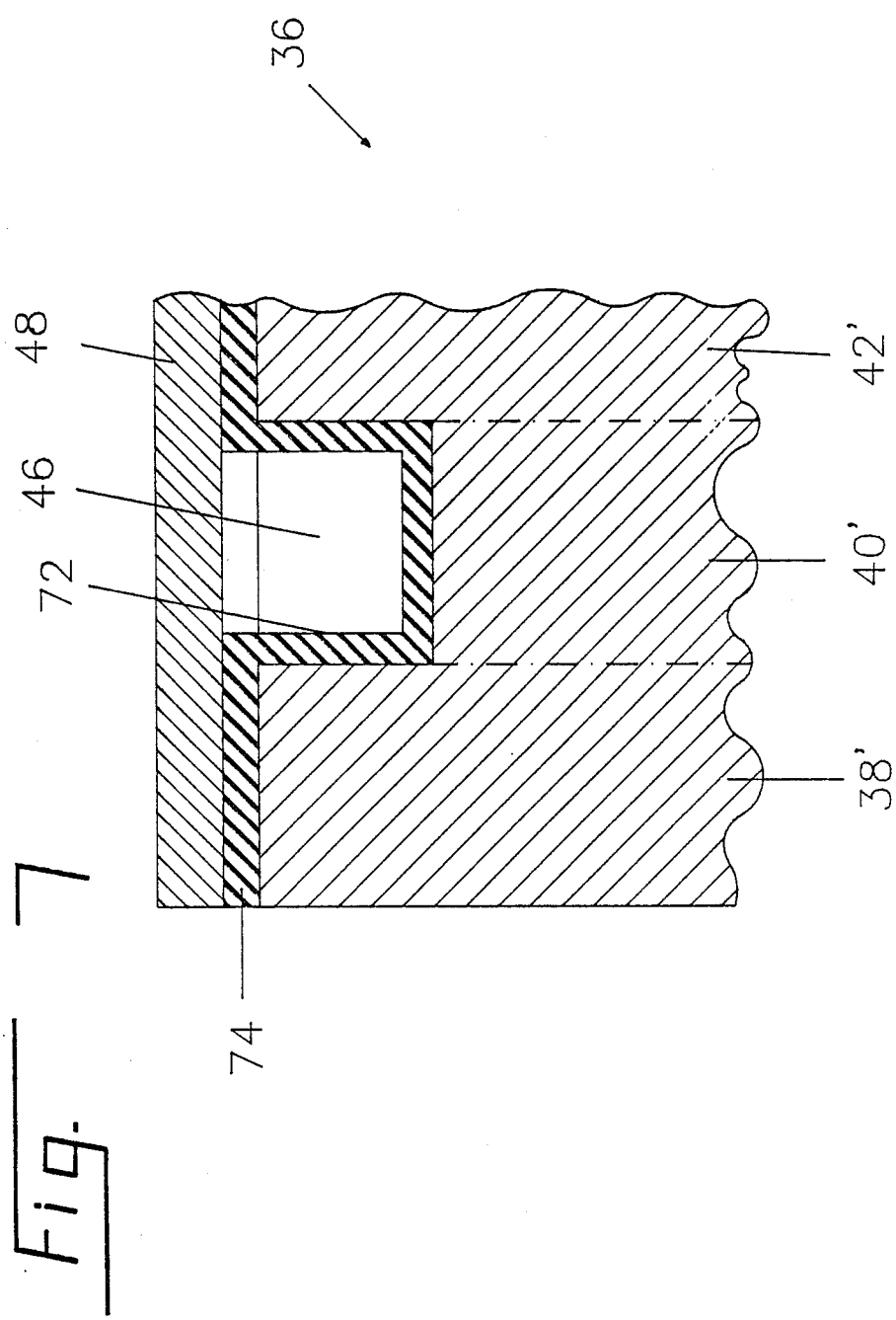

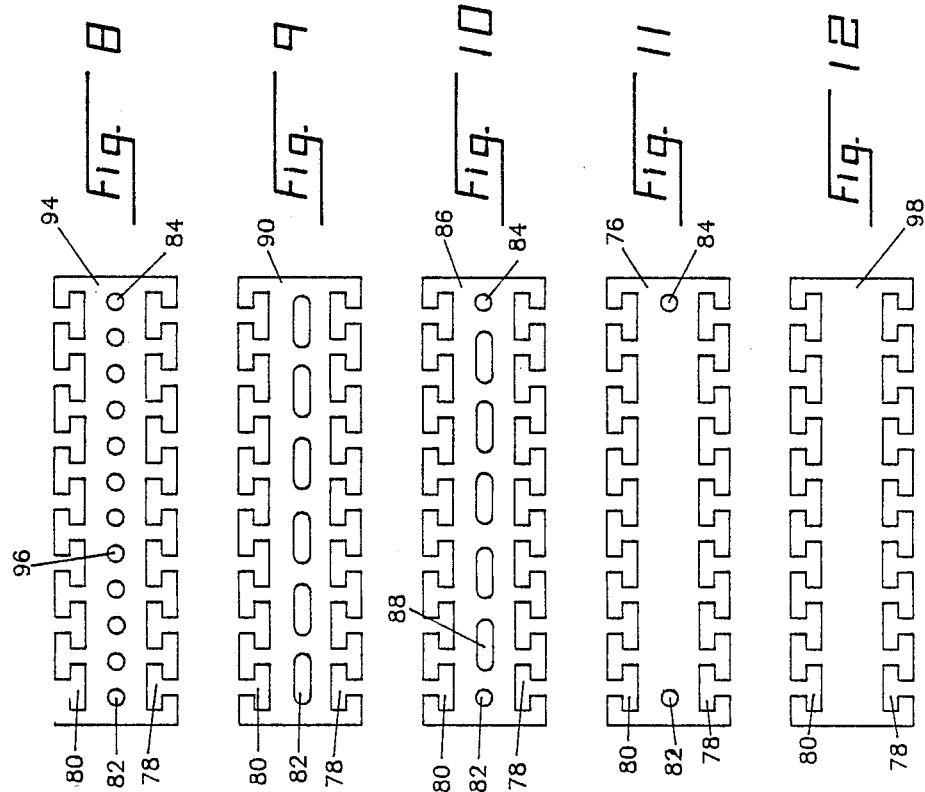

COOLING SYSTEM FOR LINEAR MOTOR

BACKGROUND OF THE INVENTION

The present invention relates to linear motors and, more particularly, to cooling systems for removing heat from wound armatures of linear motors.

In my prior U.S. Pat. No. 4,560,911, I disclose a linear motor having a laminated slotted stator in the slots of which armature windings are wound. The motor employs a permanent magnetic field member facing the armature for producing linear force or motion of a movable member which may be either the armature or the field member.

The ultimate limit on the amount of force or work obtainable from a linear motor, in common with other motor types, is imposed by resistive heating in the armature windings. In my prior patent application, Serial No. 638,488, now U.S. patent Ser. No. 4,625,132 I employ a U-shaped motor casing enclosing the armature and field member. A seal closing the opening of the U-shaped frame permits the entire motor frame to be used as a duct for a cooling fluid, such as air. The air passes along the duct until released in the vicinity of the movable member. When used in a linear motor wherein only the armature coils in the vicinity of the movable member are energized, this device is very effective in directing the cooling air to the area it is needed.

I disclose liquid cooling systems in my U.S. patent application Ser. No. 887,383, now matured into U.S. Pat. No. 4,749,921, and U.S. patent application Ser. No. 859,915, now abandoned. In the above referenced patent, I employ a ladder or serpentine cooling coil disposed in the slots to remove heat from the armature iron. In Ser. No. 859,915, I disclose a non-magnetic armature with molded-in cooling coils.

OBJECTS AND SUMMARY OF THE INVENTION

It is an object of the invention to provide cooling for a linear motor requiring a minimum of change in conventional iron armature construction.

It is a further object of the invention to provide a cold plate containing cooling channels for attachment to an armature of a linear motor.

It is a still further object of the invention to provide cooling for a linear motor employing channels formed by selection of lamination shapes and by covering a surface of the channels with a cover plate.

It is a still further object of the invention to provide an armature for a linear motor in which channels formed in the laminations are sealed against fluid leakage by an impermeable layer.

Briefly stated, the present invention provides an armature of a linear motor cooled by a serpentine channel formed in the lower surface thereof and sealed with a sealing plate. In one embodiment, the serpentine channel is formed in a separate cold plate in good thermal contact with laminations of the armature. In another embodiment, the serpentine channel is formed by stacking bundles of laminations having suitably formed notches therein. The bottom of the serpentine channel is sealed with a sealing plate. A sealant layer between the laminations and the serpentine channel prevents coolant leakage from the serpentine channel into the laminations. A sealing interlayer may be interposed between the surfaces of the lamination bundles and the sealing plate, both for sealing against coolant leakage and for affixing the sealing plate in position. The sealant layer and the sealing interlayer may be of the same material and formed at the same time.

According to an embodiment of the invention, there is provided apparatus for cooling an armature of a linear motor comprising: the armature including a magnetic metal portion having windings adjacent a first surface thereof, at least one coolant channel opening outward from a second surface of the magnetic metal portion, the at least one coolant channel including means for receiving a coolant inflow and means for delivering a coolant outflow, the at least one coolant channel including a sealing plate covering the coolant channel, and means for preventing loss of coolant from the at least one coolant channel.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a perspective view of a stator of a linear motor.

FIG. 2 is a side view of an armature of a linear motor from which, detail unnecessary to the present description is omitted.

FIG. 3 is a bottom view of the armature of FIG. 2 partially cut away to show coolant channels therein.

FIG. 4 is a bottom view of a different embodiment the armature of FIG. 2.

FIGS. 5A-5D are side views of laminations showing the different bottom shapes combinable to form coolant channels in an assembled armature.

FIG. 7 is a cross section taken along VII—VII in FIG. 6.

FIGS. 8-12 are a set of laminations for producing an armature of a two-sided linear motor cooled according to an embodiment of the invention.

DETAILED DESCRIPTION OF THE PREFERRED EMBODIMENT

Figure 6:
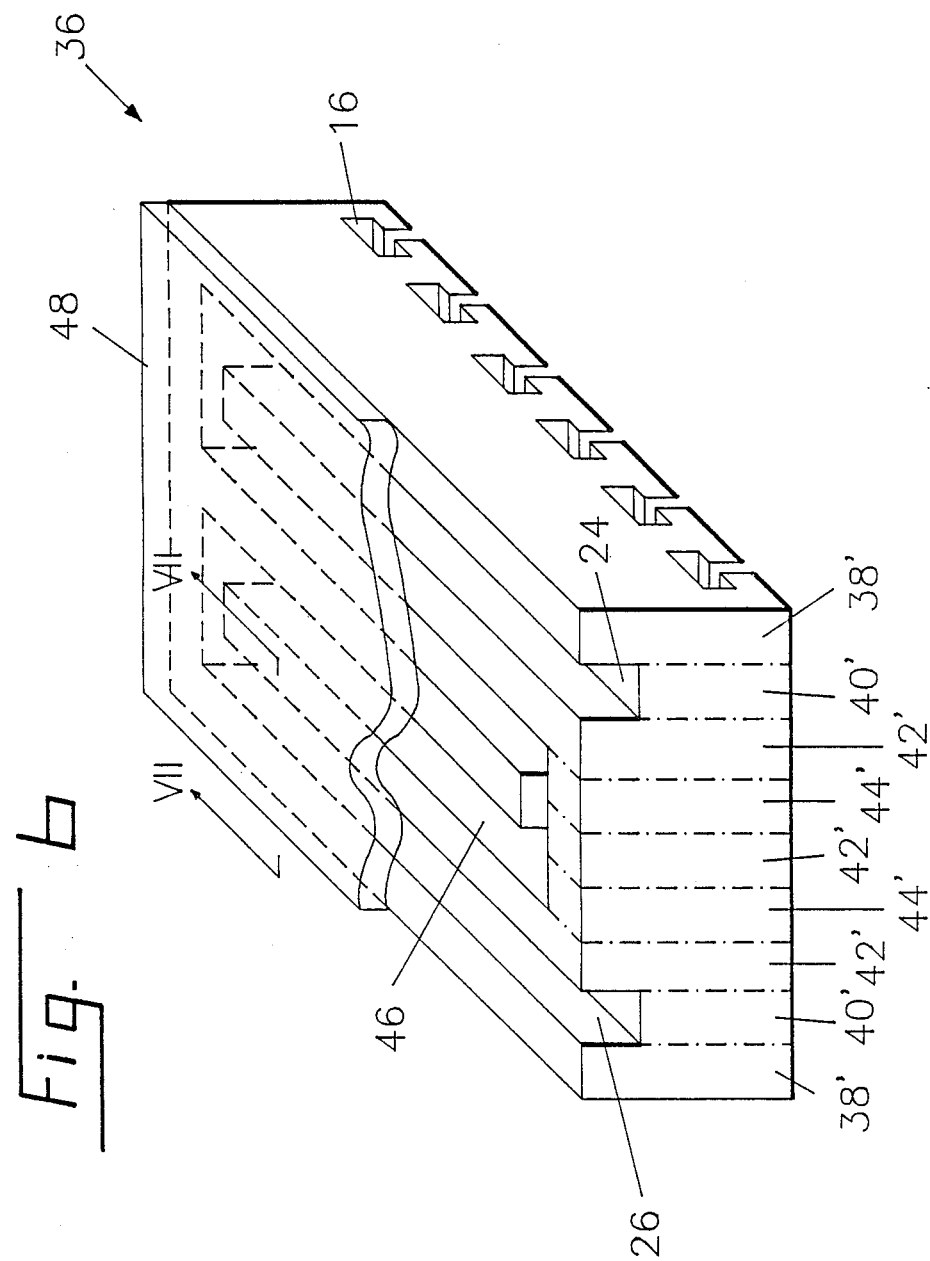
FIG. 6 is a bottom perspective view of an armature according to an embodiment of the invention with a sealing plate partially cut away to reveal internal details.

Referring now to FIG. 1, there is shown, generally at 10, a linear armature assembly having a U-shaped frame 12 containing a wound armature 14 centrally disposed therein. Wound armature 14 is conventionally built up of a plurality of laminations (not individually shown) of magnetic metal mutually insulated from each other. Each of the laminations includes a plurality of inverted T-shaped slots 16 forming teeth 18 about which are wound windings 20.

As will be apparent from my above-referenced patents and applications, the disclosures of which are herein incorporated by reference, a plurality of permanent magnets (not shown) on a movable member (not shown) face the upper surface of wound armature 14 for receiving a drive force through magnetic fields generated by the application of DC power to selected ones of teeth 18.

As previously noted, the maximum force or work which can be obtained from a linear motor employing linear armature assembly 10 is limited by its ability to dissipate heat generated by resistive losses in windings 20. In commercial motors, insulation on the wires making up windings 20 begins to degrade when the wires attain a temperature of, for example, about 300 degrees C. Higher-temperature insulation, although available, adds to the cost of the apparatus.

The mass of metal making up wound armature 14 is a heat sink with a substantial heat capacity. In many conventional linear motors, commutation, or other techniques, are employed to energize only the few of windings 20 which are in the vicinity of the permanent magnets (not shown) on the movable member. The large heat capacity, and generally good heat conductivity of wound armature 14 helps spread out the heat to increase radiative and convective cooling of wound armature 14 and windings 20.

At some level of input current to windings 20, the ability for heat sinking and radiative and convective cooling is insufficient to prevent an unacceptable temperature rise in windings 20.

Referring now to FIG. 2, a side view of a wound armature 14 is shown from which details unnecessary to the disclosure of the invention are omitted. A cold plate 22 is affixed to the bottom of wound armature 14 with provision for coolant inflow 24 and coolant outflow 26.

Referring now also to the bottom view of wound armature 14 in FIG. 3, a channelled plate 28 is mounted in good thermal contact with wound armature 14. Channelled plate 28 includes a serpentine channel 30 formed in a surface thereof by any convenient means such as, for example, milling, interconnecting coolant inflow 24 and coolant outflow 26. A sealing plate 32 is sealingly installed over channelled plate 28 to form a sealed channel through serpentine channel 30 between coolant inflow 24 and coolant outflow 26. Due to its good thermal contact with wound armature 14, flowing coolant in cold plate 22 is capable of removing a substantial amount of heat from wound armature 14 and thus permits higher currents to be applied for longer times to windings 20.

Referring now to FIG. 4, an alternate embodiment of the invention employs a bifurcated sealing channel 34 receiving coolant from coolant inflow 24 at a single point and discharging coolant to coolant outflow 26 at a pair of points. The embodiment of FIG. 4 is otherwise similar to the embodiment of FIG. 3.

I have discovered that cooling can be obtained in an armature of a linear motor without the addition of a cold plate. Referring now to FIGS. 5 and 6, a linear armature 36 is built up by stacking packets of four different types of laminations 38 (FIG. 5A), 40 (FIG. 5B), 42 (FIG. 5C) and 44 (FIG. 5D) to form a serpentine channel 46 in the bottom surface of linear armature 36. A sealing plate 48 is sealed over serpentine channel 46 to seal against coolant leakage from serpentine channel 46 between coolant inflow 24 and coolant outflow 26.

More specifically, lamination 38 has a straight unbroken bottom edge 50. Lamination 40 has a long notch 52 extending from an end 54 of lamination 40 and ending in a downward-extending tab 56. Lamination 42 includes an unbroken bottom edge 58 except of a notch 60 therein. A downward-extending tab 62 separates notch 60 from an end 64 of lamination 42. It should be noted that the size of downward-extending tab 62 is substantially equal to the size of downward-extending tab 56,(FIG. 5B). It should be noted that lamination 42 may be turned end for end to position notch 60 in the position indicated in dashed line, thereby providing an alternative position for notch 60. Lamination 44 includes a long notch 66 having downward-extending tabs 68 and 70 at its ends. Downward-extending tabs 68 and 70 are the same size as downward-extending tabs 56 and 62.

As is conventional, all laminations in linear armature 36 are preferably thin to reduce eddy current losses. Serpentine channel 46 is formed by stacking a bundle of identical laminations of one of the types in FIGS. 5A–5D side by side until the desired bundle thickness is attained. The bundles formed by the illustrated lamination types are indicated by priming their reference designators from FIGS. 5A–5D. That is, working in from both sides, bundles 38' are made up of a stack of laminations 38 shown in FIG. 5A. Working in from each side, two bundles 40' made up of laminations 40 of FIG. 5B permit coolant flow into and out of serpentine channel 46. Transverse coolant flow is provided through bundles 42' with their notches 60 located further from the viewer. Forward fluid flow is provided in the next pair of bundles 44'. The center bundle 42' is the same as those third from the edges except that it has been turned end for end to position its notch 60 in the alternative position nearer the viewer.

Without some help, the laminations of linear armature 36 may have difficulty retaining a liquid coolant without leakage. Leakage is undesirable in such electrical equipment, especially when water is used as the coolant.

Referring now also to FIG. 7 a fractional cross section of 36 allows a sealant layer 72 lining the surface of serpentine channel 46 to prevent fluid leakage into the remainder of linear armature 36. A sealing interlayer 74 may also be disposed between the upper surfaces of bundles 38'–44' (see FIG. 6) and the lower surface of sealing plate 48.

Sealant layer 72 may be of any convenient material having suitable sealant and temperature properties to withstand the intended use in linear motors. Sealant layer 72 may be, for example, a curable epoxy resin applied by brushing, spraying or dipping, over all surfaces of serpentine channel 46 and then cured in place. Sealing interlayer 74 may the same or a different material. If sealant layer 72 and sealing interlayer 74 are of the same material, they may be applied and cured in a single operation. Sealing interlayer 74 preferably has sufficient adhesive properties to secure sealing plate 48 sealably in place without requiring other means of attachment, although auxiliary attachment devices such as, for example, a screw (not shown), should not be precluded. A further alternative for sealant layer 72 and/or sealing interlayer 74 includes a film of material laid over a surface of the laminations and urged into serpentine channel 46 by conventional means such as, for example, heat and vacuum forming.

Referring now to FIGS. 8–12, there are shown a set of laminations useful in fabricating an armature of a linear motor according to a further embodiment of the invention. Before continuing, it is worth noting that this embodiment is specifically to produce a two-sided armature (not shown) with windings in slots in opposed surfaces. Such an armature is operated in a slot internally lined on facing surfaces with arrays of permanent magnets positioned and poled to interact with current in the windings.

An entry lamination 76 (FIG. 11) includes a first plurality of slots 78 along one edge and a second plurality of aligned slots 80 along the opposed edge. First and second coolant holes 82 and 84 are centered near opposed ends of entry lamination. A return lamination 86

(FIG. 10), having coolant holes 82 and 84 aligned with corresponding elements in entry lam 76, also includes turning slots 88. A far-end turning lamination 90 (FIG. 9) includes turning slots 92 located at longitudinal positions intermediate those in return lamination 86. A main-run lamination 94 (FIG. 8), besides including coolant holes 82 and 84, also includes a plurality of equally space coolant holes 96 along its length. Finally, an end-closing lamination 98 (FIG. 12) contains no coolant holes.

An armature is formed by stacking the laminations of FIGS. 8–12 in the following sequence:

one or more entry laminations 76 are stacked at the side of the armature to which coolant is fed and from which it is drained;

a plurality of return laminations 86 are stacked next to the entry laminations 76;

a plurality of main-run laminations 94 are stacked next to the return laminations 86, these form the main part of the thickness of the armature;

a plurality of far-end turning laminations 90 are stacked next to the main-run laminations 94; . and finally, one or more end-closing laminations 98 are stacked next to the far-end turning laminations 90.

In operation, assuming that coolant enters coolant hole 82 in entry lamination 76 and exits coolant hole 84 therein, the coolant flows through the aligned coolant holes 82 in laminations 86 and 94 until it reaches the first turning slot 92 in far-end turning lamination 90. Since the turning slots 92 in far-end turning lamination 90 are closed by end-closing lamination 98, the coolant is returned through the aligned next-adjacent main-run coolant hole 96 in main-run lamination 94. Upon reaching the stack of return laminations 86, it finds turning slot 88 blocked by the unpierced portions of entry lamination 76. Consequently, the coolant is turned outward through the aligned next-adjacent main-run coolant holes 96. Finally, after traversing the with of the armature several times, the coolant reaches aligned coolant holes 84 through which it is conveyed back through entry lamination 76 for drainage.

As in previous embodiments, means (not shown in FIGS. 8–12) are required to prevent coolant leakage between laminations. Such means may include tubes in the coolant holes or an impermeable coating in the holes.

An embodiment of the invention is foreseen using only main-run laminations 94. In this embodiment, the coolant-turning functions may be performed by external means such as, for example, U-tubes (not shown) interconnecting predetermined ones of the aligned main-run coolant holes 96 to produce a serpentine path. In a different embodiment, a manifold at a coolant-feed end of the armature feeds all main-run coolant holes in parallel for one-pass coolant flow through the armature. A manifold may also be provided at the drain end of the armature.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

The invention claimed is:

1. Apparatus for cooling linear motor comprising:
   an armature including a magnetic metal portion having windings adjacent a first surface thereof;
   at least one coolant channel opening outward from a second surface of said magnetic metal portion:
   said at least one coolant channel including means for receiving a coolant inflow and means for delivering a coolant outflow;
   said at least one coolant channel including a sealing plate covering said coolant channel; and
   means for preventing loss of coolant from said at least one coolant channel.

2. Apparatus according to claim 1 further comprising a cold plate affixed to said second surface, said at least one coolant channel being formed in a surface of said cold plate.

3. Apparatus according to claim 2 wherein said sealing plate is affixed over said coolant channel in said cold plate.

4. Apparatus according to claim 1 wherein said magnetic metal portion includes a plurality of laminations, said laminations including a plurality of different shapes, said laminations being assembled into bundles wherein said plurality of different shapes forms said at least one coolant channel.

5. Apparatus according to claim 4 wherein said sealing plate is affixed over said laminations.

6. Apparatus according to claim 5 wherein said means for preventing loss of coolant includes a sealant covering at least said coolant channel.

7. Apparatus according to claim 6 wherein said sealant includes a plastic resin.

8. Apparatus according to claim 7 wherein said plastic resin includes an epoxy resin.

9. Apparatus according to claim 5 wherein said means for preventing loss of coolant includes a sealing layer covering said second surface including said at least one coolant channel.

10. Laminations for forming an armature of a linear motor comprising:
    each of said laminations including a first plurality of slots at a first edge thereof and a second plurality of slots at a second edge thereof;
    said first and second pluralities of slots being suitable for installation of windings of said armature therein to form a two-sided armature therefrom;
    a plurality of aligned coolant holes in said laminations;
    means for feeding a coolant to at least one of said plurality of aligned coolant holes whereby a coolant flow into said armature is attainable;
    means for draining said coolant from at least one of said plurality of aligned coolant holes, whereby a flow of said coolant through said armature is attainable; and
    means for preventing loss of coolant from said at least one of said plurality of aligned coolant holes.

11. Laminations according to claim 10, wherein at least one of said laminations includes turning slots effective for returning a flow of said coolant from one of said aligned coolant holes to another thereof whereby an out-and-back coolant flow is attained.

* * * * *